J. SHAW.
METHOD OF PRODUCING MOVING PICTURES IN COLORS.
APPLICATION FILED JAN. 24, 1918.
1,289,940. Patented Dec. 31, 1918.
2 SHEETS—SHEET 1.
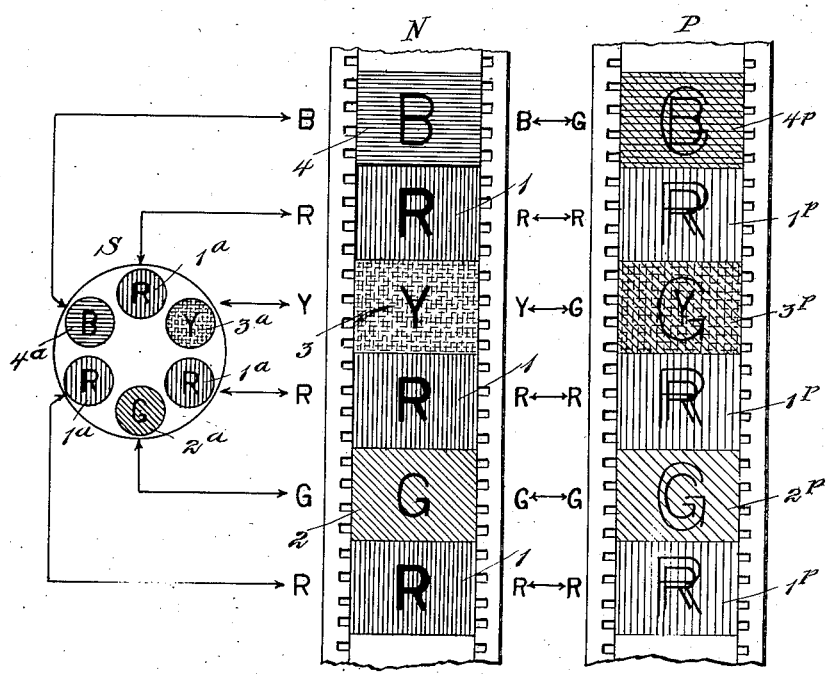
WITNESSES
INVENTOR
Joseph Shaw
BY
ATTORNEYS

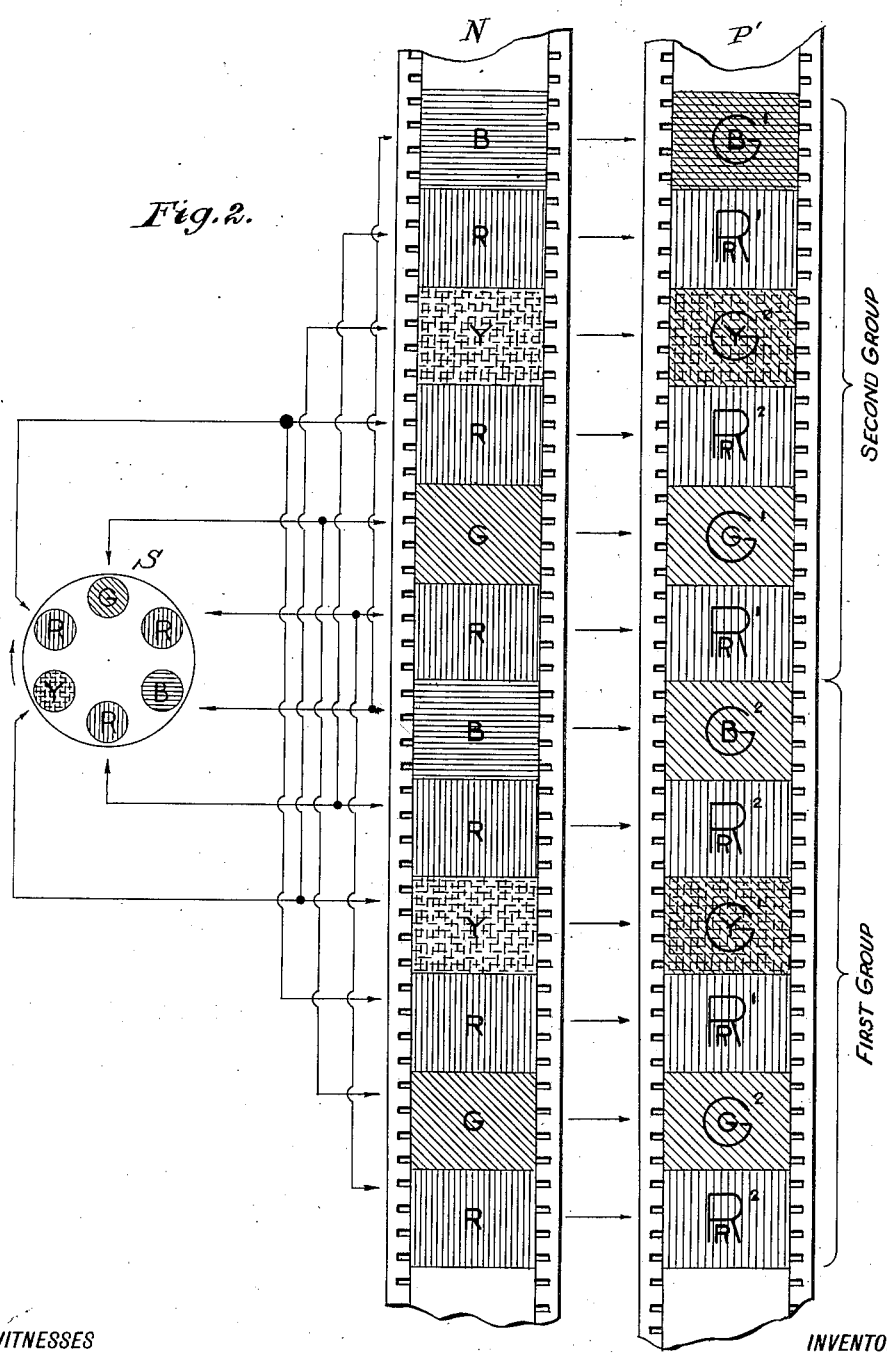

UNITED STATES PATENT OFFICE.

JOSEPH SHAW, OF NEW YORK, N. Y., ASSIGNOR TO RAINBOW PICTURES CORPORATION, A CORPORATION OF NEW YORK.

METHOD OF PRODUCING MOVING PICTURES IN COLORS.

1,289,940.      Specification of Letters Patent.      Patented Dec. 31, 1918.

Original application filed July 31, 1917, Serial No. 183,683. Divided and this application filed January 24, 1918. Serial No. 213,539.

*To all whom it may concern:*

Be it known that I, JOSEPH SHAW, a citizen of the United States, and a resident of the city of New York, borough of the Bronx, in the county of the Bronx and State of New York, have invented a new and Improved Method of Producing Moving Pictures in Colors, of which the following is a full, clear, and exact description.

This application is a division of my application for United States Letters Patent, Serial No. 183,683, filed July 31, 1917, and is made in accordance with the requirements of the Patent Office.

This invention relates more particularly to the art of taking and projecting motion pictures in colors, wherein the successive pictures are taken on orthochromatic or panchromatic negative film with the aid of recurring color filters and positive transparencies of such films are similarly projected.

The invention has for its general object to provide means whereby the natural shades and tones of the subject or scene photographed can be more nearly reproduced on projection; and the more specific object is to reduce to a minimum the "flicker" effect in color moving picture projection which is very apparent in the moving picture color methods that have been tried up to this date.

Analyzing the problem of "flicker" common to moving pictures in colors I have made comparison with the regular "black and white" moving pictures and it occurred to me that the trouble could be remedied if the positive film ready for projection in colors could be made of such quality that the differently colored separated picture sections comprising the image should not only show a difference in the opacities of the color separated picture sections, thus controlling and selecting the colored light which it permits to pass, but these opacities should be arranged and regulated to such a degree that if projected without color filters they should show, with the exception of the red color separated picture sections, images closely resembling the "black and white" moving picture where the amount of "flicker" is usually at a minimum.

I based my theory which I later found to be a fact, that the disturbance or "flicker" which is perceived by the retina of the eye is due to violent light changes caused by quickly and successively moving these picture section opacities alternating in contrast of strong light and shadows, what in one of the positive picture image sections is expressed as a transparent light passing spot and as an opaque light preventing spot in the next following picture image section.

For illustration, if we will think of the spectrum as one chain of graduated colors and hues extending from one end of the spectrum to the other, as soon as we will take any link out we break the continued line of the chain and certain hues or shades of colors will be missing; the gradual color scale will be disturbed, the absorption bands will be sharply defined and a "gap" between the primary colors of the spectrum will be formed which would cause upon the retina of the eye a sensation similar to looking upon a board marked with black and white checkers, a sensation causing an immediate disturbance to the eye, and if such a sensation is continued for a length of time, the eye fatigues and "flicker" increases in proportion.

And so, indeed, a similar sensation of "gaps" is caused upon the retina when different sharp cut primary color filters are used in forming the different color separated opacities on the film. Besides causing "flicker" these "gaps" prevent the eye from perceiving the colors in their natural shades and hues, as each missing link represents a color shade or hue which is necessarily a part of the spectrum.

Further analyzing the "gaps" I have observed in the projection of the different primary colors, that the "flicker" was mostly trying upon the eye when green or bluegreen colored light was being passed by sharply cut color separated opacities, the red colored light being passed by the red color separated picture opacities did not cause much "flicker" or pulsating effect upon the eye.

From that time on my efforts were directed to picture section opacities representing separations of wave lengths different from red, by regulating the opacities translating the photographic details from orange, green, yellow to blue shades of the subjects to such an extent that when a positive was made from a thus regulated negative film and was projected for instance in monochrome, say green light, a graduated scale of different green color was perceived by me ranging from deep green to a very light blue green shade, according to the natural colors of the subject; the green light sifting through the translucent or semitranslucent varying opacities of the picture image sections and forming these different hues of green color without any "gaps".

Then when the so regulated picture image opacities were successively projected in green colored light in combination with alternating picture section opacities colored in red light, not only was "flicker" materially reduced but remarkably true shades of different color combinations very closely approaching natural colors formed by the mixture of red colored light alternating with different hues and delicate shades of green light filtering through the differently shaded and graduated opacities representing photographic details from orange, green, yellow to blue shades of colors of the subject or scene.

In order to register on the moving picture orthochromatic or panchomatic negative film the color selected picture image section opacities for the purpose above described I use in the taking camera in front of the negative film a movable color screen geared in any approved manner to travel in synchronism with the film, said screen having six openings, each filled with one color filter, these six color filters comprising three color filters of short wave length and consisting of green, yellow and blue color respectively and three color filters of a long wave length and each consisting of a red color only, so arranged that each of the three red color filters alternates to form a pair with one of the three different color filters of the short wave length. When thus arranged and used in combination with an orthochromatic or panchromatic negative film these six color filters register lengthwise of the film picture image section opacities in the following order: red, green; red, yellow; red, blue; thus forming an unbroken chain of color separations having no "gaps".

From this negative film is made a positive film bearing the successive groups of the six picture image sections of color selection, which positive film can be directly tinted, dyed or toned photographically, in such a manner that the picture image sections of red color selection will bear a red color tint and the picture image sections of green, yellow and blue color selection will each bear a green color tint, and the projection of the positive film will take place without any recurring color filters. The tinting is preferably carried on by the method disclosed in the application for United States Letters Patent, Serial No. 181,279, filed by me jointly with John W. Berwick, on July 18, 1917.

In the accompanying drawings—

Fig. 1 is a diagrammatic view showing a section of a negative film and the relation of the picture image sections to the picture-taking screen and the relation of the image sections of the negative film to the tinted corresponding image sections of the positive film and to the positive film projection screen when the film is regarded as a positive.

Fig. 2 is a similar view showing a positive film in four tints.

Referring to the drawing, N designates sufficient of a negative film to include a group of picture image sections of which alternate sections 1 are red, as designated by the letter R, and the sections 2, 3 and 4 intermediate adjacent sections 1 are green, yellow and blue, as designated by the letters G, Y and B. Adjacent the film N is a color screen S which moves in synchronism with the film by any approved manner and is employed in taking of the moving pictures. This screen has a plurality of red color filters $1^a$, through which the picture sections 1 of the film group are exposed. The screen also has green, yellow and blue filters $2^a$, $3^a$ and $4^a$, respectively arranged in alternate relation to the red filters. The relation of the color filters to the picture image sections can be traced by the connecting arrow lines 5.

In the figures P designates the positive film, of which $1^p$ are the picture image sections corresponding to the red section 1 of the negative film N, and these are tinted red. The picture image sections $2^p$, $3^p$ and $4^p$ correspond respectively to the sections 2, 3 and 4 of the negative film and they are tinted green. With a positive thus tinted projection is made without the use of recurring color filters.

In Fig. 2 the screen S and negative film N are the same as in Fig. 1, but a greater length of the negative film is shown to bring out the relation thereto of a plurality of groups of picture image sections in the positive film P'.

To effect a wider range of color tints it is possible to still more enhance and increase the variety of mixtures of different color wave lengths by tinting my film into two different tints of red color and two different tints of green color, for instance, pure red and orange-red, blue-green and yellow-green, designated as $R'$—$G'$ and $R^2$—$G^2$.

It will be clear by reference to Fig. 2 that the picture image sections of green, yellow and blue color selection in the group $a$ of six picture image sections are differently affected by the $G'$ and $G^2$ tints than they are in the next following group $b$. In a given group, for instance, the picture image sections of green and blue color selection are affected by the G² tint and the picture image section of yellow color selection is affected by the G' tint, but in the next following group the order reverses — the picture image section of green and blue color selection will be affected by the G' tint and the picture image section of the yellow color selection by the G² tint. Also, in every group, every other picture image section of red color selection is affected by the R' tint and the intermediate picture image sections of red color selection by the R² tint.

Fig. 2 illustrates the film ready for projection in four tints; the R' is a pure red tint and the R² is an orange-red tint; the G' is a yellow-green tint and the G² is a blue-green tint, and when projected at a speed of about thirty pictures per second, the picture image sections bearing their respective tints are overlapped by persistency of vision, thus forming pairs, the color combinations of which are being successively varied, due to the changing relation of the different color tints in combination with the varied color selections of the picture image sections, for example, as shown in the drawing, assuming the tinted film travels downwardly, beginning with the picture image section of red color selection bearing the R² tint, it will be plain that in a given group of six picture image sections, the R² and G² tints affect the picture image sections of red and green selection, whereas in the following group of six picture image sections the picture image sections of red and green color selection will be affected by the R' and G' tints; likewise, in the first group, the picture image section of red and yellow color selection will be affected by the R' and G' tints, whereas in the following group of six picture image sections, the picture image sections of red and yellow color selection will be affected by the R² and G² tints, so also, in the first group, the picture image section of red and blue color selection will be affected by the R² and G² tints and in the following group the picture image sections of red and blue will be affected by the R' and G' tints.

By being able to form these different combinations in pairs of various shades of reds and greens carried by the persistency of vision in the eye of the observer, the effect of balanced colors is carried from one group to another, each pair harmoniously linking with the others in the successive movement of the film, progressively continuing the illusion of colors in such delicate graduation as to eliminate gaps and reduce flicker to a minimum.

Where in this disclosure I have used the terms "pure red", "orange-red", "red", "green", "yellow-green", "blue-green", "yellow" and "blue" color or colors, whether applied to filters or color selections of the picture image sections, I wish to have it distinctly understood that I do not limit myself to any particular density or shade of these colors as one skilled in the art may find it convenient, when taking or projecting photographic records of a subject or scene, to first consider the color scale and govern the matter accordingly, choosing lighter or darker shades of color filters in order to properly render the color values. I am aware many a subject, where colors of short wave predominate, reds forming a secondary part, that one of the red filters used in the taking screen can be dispensed with, inserting an "orange" instead, but not requiring any change in my methods of projection. Also under certain light conditions it may be found desirable to use a light yellow filter either in front, back or between the lens to modify the predominating blue-violet rays.

While I prefer under my disclosure to arrange and use the color filters in the order described, if desired successful results rendering graduated color values can also be obtained by either substituting a yellow filter for the blue, or a blue filter for the yellow, the other filters remaining in the same order as above disclosed.

To make it plain, in my preferred method, the negative film upon exposure with the aid of a recurring color screen having six color filters, registers in groups of six picture image sections of color selection in the following order: red, green; red, yellow; red, blue. If a yellow filter is inserted in place of the blue, the order will then be— red, green; red, yellow; red, yellow, in which case the green will appear once, and the yellows twice, and the reds three times in each group of six picture image sections. If a blue filter is inserted in place of a yellow the order will then be—red, green; red, blue; red, blue; in which case the green will appear once, the blues twice and the reds three times in each group of six picture image sections.

It will be readily understood from the above, but I wish to make it plain, that in the successive rendering of the groups of six picture image sections of color selection, the picture image section of green color selection will necessarily register only once in every six picture image sections.

Having thus described my invention, I claim as new and desire to secure by Letters Patent:

1. A method of projecting moving pictures in colors in a standard moving picture projector without recurring color filters, which consists in projecting a positive film, having successive groups of six picture image sections, each section showing a color selection, three of which are of red color selection and alternately disposed in their relation to the other three picture image sections of the group, of which one is of green, one of yellow and one of blue color selection, the picture image areas of red color selection bearing a red color tint and the picture image areas of green, yellow and blue color selection each bearing a green color tint.

2. A standard moving picture positive film showing continuous aspects of an object or scene in successive groups of six picture image sections, each section showing a color selection, three of which are of red color selection and alternately disposed in their relation to the other three picture image sections of the group, of which one is of green, one of yellow and one of blue color selection, the gelatin of the picture image areas of red color selection bearing in the areas thereof a uniform tint of red color and the gelatin of the green, yellow and blue color selection areas each bearing in the areas thereof a uniform tint of green color.

3. A method of projecting moving pictures in colors in a standard moving picture projector without recurring color filters, which consists in projecting a positive film having successive groups of six picture image sections, each section showing a color selection, three of which are of red color selection and alternately disposed in their relation to the other three picture image sections of the group, only one of which is of green color selection and the remaining two are of primary color selection other than red or green, the picture image areas of each red color selection bearing a red color tint and the other picture image areas each bearing a green color tint.

4. A method of projecting moving pictures in colors in a standard moving picture projector without the aid of recurring color filters, which consists in projecting a positive film, having successive groups of six picture image sections, each section showing a color selection, three of which are of red color selection and alternately disposed in their relation to the other three picture image sections of the group, of which one is of green, one of yellow and one of blue color selection, the picture image areas of red color selection bearing a red color tint and the picture image areas of green, yellow and blue color selection each bearing a green color tint, these red and green tints differing in shades of pure red and orange-red; blue-green and yellow-green, and are so arranged that in a given group of six picture image sections, the areas of the picture image sections of green and blue color selection bear a blue-green tint and the area of the picture image section of yellow color selection bears a yellow-green tint, whereas, in the next following group, the areas of the picture image sections of green and blue color selection are bearing yellow-green tints and the area of the picture image section of yellow color selection is bearing a blue-green tint, and every other area of the picture image section of red color selection is bearing a pure red tint and the intermediate areas of the picture image sections of red color selection are bearing an orange-red tint.

5. A method of projecting moving pictures in colors in a standard moving picture projector without recurring color filters, which consists in projecting a positive film having successive groups of six picture image sections, each section showing a color selection, three of which are of red color selection and alternately disposed in their relation to the other three picture image sections of the group, of which one is of green, one of yellow and one of blue color selection, the picture image areas of red color selection bearing a red color tint and the picture image areas of green, yellow and blue color selection each bearing a green color tint, these red and green color tints differing in shades of pure red and orange-red; blue-green and yellow-green and designated as $R'$, $R^2$; $G'$, $G^2$, respectively, and are so arranged that in a given group of six picture image sections representing three pairs of picture image sections, one pair comprising red and its next following green color selection is bearing in its picture areas, uniform tints $R^2$ and $G^2$, respectively, and the second pair, comprising the red and its next following yellow color selection is bearing in its picture areas uniform tints $R'$ and $G'$, respectively, and the third pair of the group comprising red and its next following blue color selection is bearing in its picture areas uniform tints $R^2$ and $G^2$, respectively, whereas in the next following group of six picture image sections the order of the color tints reverses in relation to the pairs, the pair of red and green is bearing the $R'$ and $G'$ tints respectively, the pair of red and yellow is bearing the $R^2$ and $G^2$ tints, respectively, and the third pair of the group comprising red and blue, is bearing $R'$ and $G'$ tints respectively, thus the pairs of picture image sections of one group producing color sensations differing from those of the next following group.

JOSEPH SHAW.